US007231045B1

(12) United States Patent
Parrott

(10) Patent No.: US 7,231,045 B1
(45) Date of Patent: Jun. 12, 2007

(54) SECURE TRANSACTION MODEM STORING UNIQUE INDICIA

(75) Inventor: William M. Parrott, Simi Valley, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/385,607

(22) Filed: Aug. 30, 1999

(51) Int. Cl.
*H04L 9/00* (2006.01)

(52) U.S. Cl. .......................... 380/266; 705/26; 705/76; 379/93.12; 379/91.01

(58) Field of Classification Search ............. 379/93.12, 379/91.01, 93.02, 93.03; 705/76, 75, 26; 713/153; 380/266, 270, 257; 902/1–5, 24, 902/26
See application file for complete search history.

(56) References Cited

U.S. PATENT DOCUMENTS

| 4,430,728 | A | * | 2/1984 | Beitel et al. .............. 379/93.02 |
| 4,694,492 | A | | 9/1987 | Wirstrom et al. |
| 4,747,076 | A | | 5/1988 | Mukai .......................... 365/96 |
| 4,831,648 | A | * | 5/1989 | Nishino ..................... 379/93.04 |
| 5,131,025 | A | | 7/1992 | Hamasaki ..................... 379/95 |
| 5,214,699 | A | | 5/1993 | Monroe et al. |
| 5,311,596 | A | * | 5/1994 | Scott et al. .................... 380/33 |
| 5,321,751 | A | | 6/1994 | Ray et al. |
| 5,351,296 | A | | 9/1994 | Sullivan |
| 5,412,730 | A | * | 5/1995 | Jones ........................... 380/46 |
| 5,455,861 | A | | 10/1995 | Faucher et al. |
| 5,500,681 | A | * | 3/1996 | Jones ........................... 348/473 |
| 5,581,613 | A | | 12/1996 | Nagashima et al. |
| 5,623,637 | A | | 4/1997 | Jones et al. |
| 5,657,389 | A | | 8/1997 | Houvener |
| 5,671,285 | A | | 9/1997 | Newman |
| 5,712,914 | A | * | 1/1998 | Aucsmith et al. ............. 380/30 |
| 5,757,021 | A | | 5/1998 | Dewaele |
| 5,760,917 | A | | 6/1998 | Sheridan |
| 5,778,071 | A | | 7/1998 | Caputo et al. ................ 380/25 |
| 5,793,868 | A | * | 8/1998 | Micali ......................... 380/28 |
| 5,799,082 | A | | 8/1998 | Murphy et al. |
| 5,802,280 | A | | 9/1998 | Cotichini et al. ........ 395/200.3 |
| 5,818,955 | A | | 10/1998 | Smithies et al. |
| 5,822,436 | A | | 10/1998 | Rhoads |
| 5,835,590 | A | | 11/1998 | Miller |
| 5,835,603 | A | | 11/1998 | Coutts et al. |

(Continued)

FOREIGN PATENT DOCUMENTS

| WO | WO97/19414 | 5/1997 |
| WO | WO99/33228 | 7/1999 |

OTHER PUBLICATIONS

T. Hong: Security Policy for Palladium Secure Modem, MYKOTRONX Inc., Doc. No. D1028, Nov. 20, 1998, pp. 1-22.*

(Continued)

*Primary Examiner*—Emmanuel L. Moise
*Assistant Examiner*—Paul E. Callahan

(57) ABSTRACT

A modem and secure communications method for the modem is disclosed in which the modem is capable of storing identifying indicia unique to the modem. The identifying indicia may include graphics data such as an image of a credit card, a signature, and/or an account holder to assist in user authentication. Software stored in the modem enables transmission of the identifying indicia to a communication line. Additional embodiments and variations are also disclosed.

12 Claims, 3 Drawing Sheets

U.S. PATENT DOCUMENTS

| | | |
|---|---|---|
| 5,835,604 A | 11/1998 | Lee |
| 5,838,902 A | 11/1998 | Shin |
| 5,848,161 A | 12/1998 | Luneau et al. |
| 5,864,126 A | 1/1999 | Hutton, Jr. .................. 235/385 |
| 6,118,768 A * | 9/2000 | Bhatia et al. ................ 370/254 |
| 6,163,489 A * | 12/2000 | Blodgett ...................... 365/200 |
| 6,308,281 B1 * | 10/2001 | Hall et al. ...................... 714/4 |
| 6,324,267 B1 * | 11/2001 | Hraster et al. ........... 379/93.02 |
| 6,349,138 B1 * | 2/2002 | Doshi et al. ................. 380/200 |
| 6,377,548 B1 * | 4/2002 | Chuah ........................ 370/233 |
| 6,490,637 B1 * | 12/2002 | Shih ............................... 710/8 |

OTHER PUBLICATIONS

PCT International Search Report dated Dec. 21, 2000 re International application No. PCT/US 00/22009, international filing date Aug. 11, 2000.

* cited by examiner

SECURE TRANSACTION MODEM STORING UNIQUE INDICIA

BACKGROUND OF THE INVENTION

1. Field of the Invention

This invention generally relates to secure online transactions conducted with or through a modem. The present invention also relates to a modem having integral identifying indicia capable of communication in an online transaction to authenticate or otherwise validate a transaction.

2. Description of the Related Art

With the rapid growth of online electronic commerce and online transfers of information, there has been a growing need to authenticate or otherwise validate the identity of the participants in online transactions. In some instances, it is desirable to positively establish the identity of an individual attempting to gain access to a data network. For example, a company or other organization may wish to provide access to its data or communication network only to employees or authorized users. This is conventionally accomplished by registering user identification information such as usernames and associating passwords with the usernames of the authorized users. For various reasons, including the failure of users to frequently change passwords, this strategy has proven unsatisfactory.

Another instance in which it is desirable to authenticate or otherwise validate user identities is in electronic or online commerce. In some instances it may be desirable to positively establish the identity of a user making a transaction to authorize a charge to a user account. The more typical sort of online transaction includes a user providing a credit card or other account information to purchase a good or service. For this type of online transaction, vendors wish to authenticate the credit card number provided for online transactions to ensure that the party attempting to complete the online transaction is in fact the owner or authorized user of that credit card number. On the user side of electronics commerce, online credit card usage has been limited by fears that credit card numbers can be readily obtained and used in an online transaction without verification that the user is authorized to use the credit card account. Online credit card usage might be encouraged if greater assurances could be provided as to the security of the transaction.

Various strategies have been attempted to provide secure online transactions. To date, these strategies have not been widely implemented, whether due to high costs or difficulties in using the secure transaction links. It would be desirable to provide a simple and cost effective method for authenticating or validating transactions.

SUMMARY OF THE PREFERRED EMBODIMENTS

Preferred embodiments of the present invention provide a modem with integral identification indicia that can be accessed by communications software such as the operating software of the modem and transmitted to a host to validate the identity of a user.

An aspect of the present invention provides a secure communications method using a modem capable of storing identifying indicia unique to the modem. The method provides communications software, stored within the modem, capable of transmitting identifying indicia to a communications line.

A secure communications modem provides a program memory adapted to store a program controlling aspects of modem operation. A processor is coupled to the program memory and executes at least a portion of a program stored in the program memory to control at least an aspect of modem operation. The program is adapted to cause the processor, under control of the program, to read identifying indicia stored integrally within the modem and communicate the identifying indicia to a host communicating with the modem.

DETAILED DESCRIPTION OF THE PREFERRED EMBODIMENTS

Figure 1:
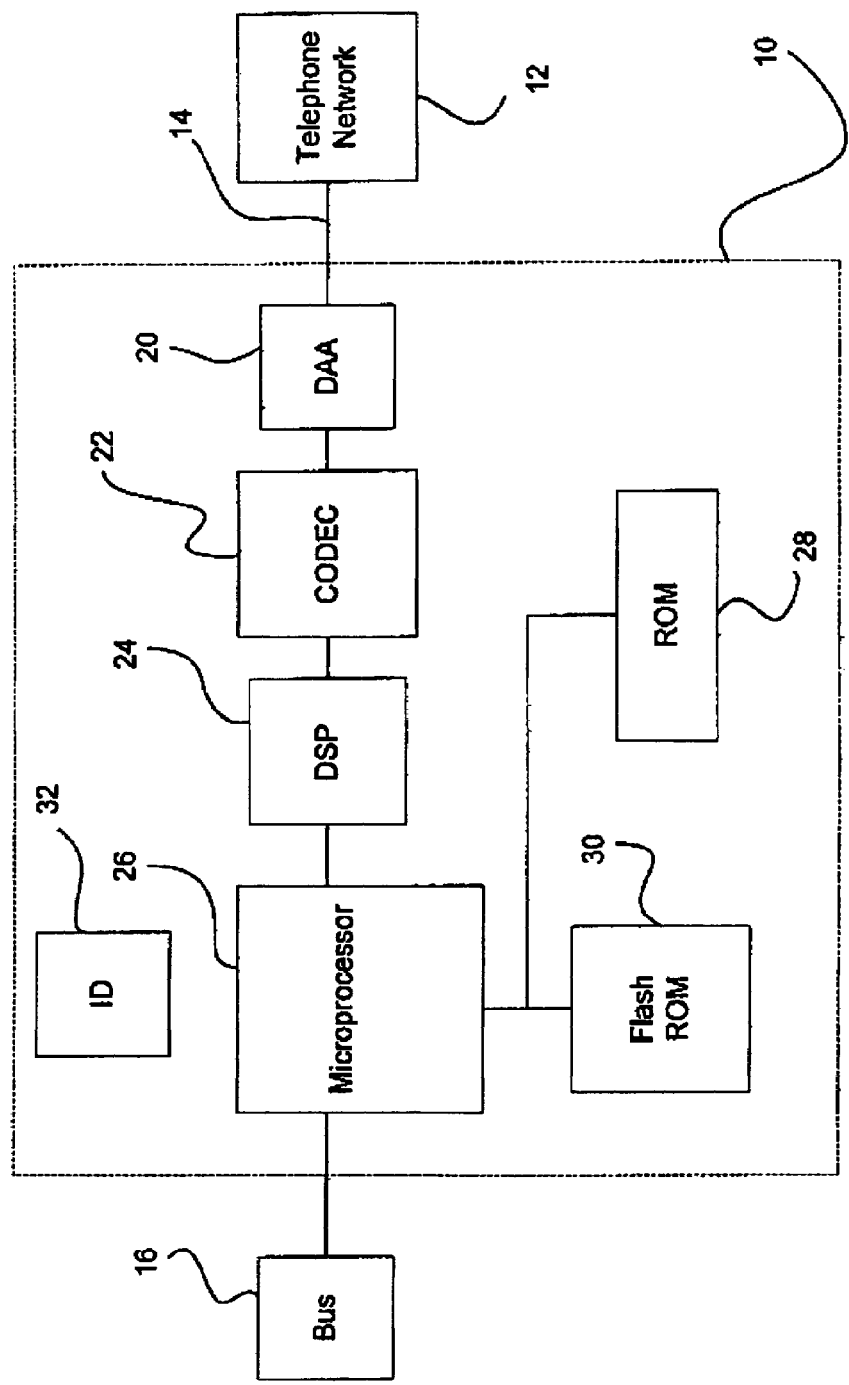
FIG. 1 illustrates a modem in accordance with a preferred embodiment of the invention.

Particularly preferred embodiments of the present invention provide identifying indicia integral within a modem in a form that can be communicated to authenticate or validate a transaction or the identity of a user. In some embodiments, the identifying indicia might be provided as part of the circuitry of the modem. In other embodiments, the identifying indicia might be stored in a memory that can only be written when the memory in which the modem's operating software is stored is also written. Regardless of the form, the identifying indicia are incorporated within the modem and capable of being communicated by the modem to a host in an online transaction. The user can cause the indicia to be transmitted, the modem can transmit the identifying indicia automatically or, when a server requests the indicia, the modem can transmit the identifying indicia to validate the identity of a user or to authenticate a credit card or other account number.

The identifying indicia may be incorporated in the circuitry of the modem itself, which makes it quite difficult to alter the indicia without manufacturing similar modem chips or modifying working chips. Such manufacture or such modification is difficult and expensive. Similarly, the identifying indicia may be incorporated in a portion of the modem's memory that can be written only when the modem operating software is written to that memory or to a logically related memory. Most preferably, the indicia are stored in such a nonvolatile memory that can only be overwritten by completely overwriting the modem operating software. In this embodiment, the identifying indicia can only be altered if the party altering the identifying indicia has possession of the operating software of the modem in a form that can be written into the memory. Again, due to the complexity of modem operating software, it is quite difficult for a party to duplicate or counterfeit the identifying indicia. Thus, particularly preferred embodiments of the invention utilize the complexity and low cost of modems incorporating identifying indicia to provide a secure communication mechanism and method. This preferred secured transaction mechanism is both easy to use and of sufficiently low cost to facilitate adoption.

A particularly advantageous embodiment of the invention provides a portable modem having integral identifying indicia so that the modem itself can be used in many ways that a credit card is presently used. An example of an appropriate portable modem might be a PCMCIA modem or other self contained modem capable of readily interfacing to a computer. By providing a portable, personalized modem having integral identifying indicia, the modem can be carried so that a user can maintain direct control of the account associated with that modem.

In accordance with certain preferred embodiments of the present invention, secure transactions are mediated through a modem having integral identifying indicia within the circuitry of the modem. However the identifying indicia are included in the circuitry of the modem, the modem preferably includes a unique identification number that can be accessed and transmitted to identify or confirm the identity of the modem being used for a transaction. The identification number, or similar identifying indicia, can be permanently provided in the modem circuitry in the form of a once programmable memory or logic array such as a laser programmable or fuse programmable memory or logic array. The identification number is accessed by communications software, such as a specially modified version of the modem operating software, as a value read out from a register and transmitted by the modem to a host to provide the identifying indicia to the host. Most preferably, when the identification number or similar indicia is communicated it is encrypted to minimize the possibility that the identification number can be intercepted in online credit card theft.

A user wishing to utilize a modem in accordance with the present invention preferably registers the secure modem with either the electronic commerce network to be accessed or, more preferably, the user registers the modem with the user's credit card company. Alternately, the credit card company or other financial institution might itself issue the modem with an associated account number. Regardless, actions are taken to associate the modem with the credit card or other account number in a secure manner, removed in time from the secure usage of the modem. In addition, because the modem is preferably issued by the financial institution that will process charges to the credit card or other account number, that institution can also include a public key within the modem to facilitate the encryption of the identification indicia for online communication. Most preferably the modem includes an encryption algorithm that is compatible with the host server that handles the online transaction.

In what is presently believed to be a particularly appropriate implementation of the invention, appropriate host software is provided on a host server of a transaction network that can interrogate a modem in accordance with the present invention to authenticate or validate a transaction. For example, the host server may process electronic commerce transactions. A user having a computer with a modem in accordance with the present invention contacts the host server over a communication network through conventional dial up access over the switched telephone network. The electronic commerce transaction proceeds through the point in which credit card or other account information is transferred. When the host server software receives the credit card or other account information, the host software interrogates the user's modem for identifying indicia. The modem software then reads out the identifying indicia and transmits the indicia to the host server in an encrypted form. The host server decodes the identifying indicia and uses those indicia to authorize or validate the transaction.

In an alternative to this embodiment, the identifying indicia may itself be a transaction account number such as a credit card number. In such an embodiment, the secure modem preferably encrypts and transmits the account number to the host server. It may in some instances be desirable to obtain additional authentication from the user, for example by requiring the user to enter a password. This embodiment provides a different sort of security in that the transaction account number is stored within the modem circuitry and can be quite difficult to read. When the account number is transmitted, it is automatically encrypted without requiring user participation. For this embodiment it is particularly preferred that the modem be small and self contained to facilitate the modem being carried.

In a different embodiment of the present invention, a different form of authentication information might be stored in nonvolatile memory on the modem. A compressed image or other authentication indicia might be stored in address space within non-volatile memory that is adjacent to or other otherwise associated with the memory that stores the modem's operating software. For example, an image of a credit card including a credit card number and a signature could be stored in the EEPROM of the modem, preferably in the same flash EEPROM in which the operating software for the modem is stored. By providing the authentication information in non-volatile memory associated with the modem's operating software, the authentication information can only be altered when the modem's operating software is altered. The authentication information can be transmitted in a manner similar to how the identification number discussed above is used. This embodiment of the modem may include the transaction account number itself and so it is desirable to request confirming authentication such as a password, a personal identification number, or even a voice authorization to validate the transaction.

In a particularly preferred embodiment utilizing a modem with identifying indicia within the modem memory, the modem might be issued by a bank, credit card company or other financial institution. Upon issuance, the identifying indicia are written into the nonvolatile memory of the modem, preferably at the financial institution. The identifying indicia might include various information including, for example, a picture of the individual to whom the modem is issued or an image of the signature of the user. Regardless of the particular identifying indicia to be stored in the modem, the identifying indicia are written into the modem's memory at the issuing institution. Significantly, the operating software for the modem is also written into the modem at the same time. This strategy ensures that only those with access to a complete copy of the appropriate modem software can alter the identifying indicia of the secure modem. Due to the complexity of the software used to operate a modem, the association of the identifying indicia with the modem operating software provides significant security to the identifying indicia.

These strategies do not require additional circuitry or significant amounts of additional programming for the modem or the host server. Consequently, this strategy provides a significant improvement in the security of online transactions without significantly increasing the cost of the modem or of such transactions. There is additional cost to financial institutions, but it is likely worthwhile to limit credit card fraud and other losses incurred through insecure credit card and online transactions.

Aspects of the invention are now described in additional detail with reference to the drawings, which form a part of this disclosure. FIG. 1 schematically illustrates an embodiment of a modem that includes identifying indicia within the credit card circuitry. The modem is generally indicated at 10 and is enclosed by the dashed line in FIG. 1. The illustrated modem is preferably in one of the standard PCMCIA configurations. The modem links to host servers or communication networks over the public switched telephone network 12 (PSTN) over a standard telephone line 14. Modems such as that illustrated in FIG. 1 interface to host computers through peripheral or interface buses 16, such as the preferred card bus that links the modem 10 to a notebook or other portable computer in particularly preferred embodiments of the present invention.

Modem 10 interfaces to the switched telephone network through a digital access arrangement 20 (DAA) that receives signals appropriate to the telephone network, e.g., 48 V DC, 130 mA, and converts those signals to a level that can be processed by the CODEC 22. CODEC receives 5 Volt analog signals from the DAA 20 and transmits similar signals to the DAA 20 for output onto the telephone network 12. Generally, the CODEC 22 interfaces with a digital signal processor (DSP) 24 and the CODEC 22 and DSP 24 communicate digital signals incoming from the telephone network or being output to the telephone network. It is not necessary to provide both a DSP 24 and a microprocessor or microcontroller 26, but many modems provide this configuration. Other modems provide only a microprocessor. It is conceivable that only a digital signal processor could be used, but such a configuration is unusual since there are some generally expected tasks for the processor 26 that are not well suited to digital signal processors. For the purposes of this application and this invention, the term processor is used generally to include any one of microprocessor, microcontroller and DSP functionality. Modems that use the presently preferred FIG. 1 configuration use the DSP to process those signals for which it is best suited and use the microprocessor 26 to communicate the with the host computer and perform other functions for which it is well suited. This is similarly true for the modem schematically illustrated in FIG. 2, below.

Microprocessor 26 controls operation of the illustrated modem and manages communication with the host computer. Typically the microprocessor 26 is provided with one or more blocks of memory for handling various different tasks. For example, the modem may provide a relatively small amount of nonvolatile memory or read only memory 28 that can be overwritten frequently. This relatively small ROM 28 is used to store small amounts of information in a nonvolatile fashion that might have to be rewritten frequently. ROM 28 might be used to store configuration information used for setting up the modem and its communication with its host computer. A second, larger block of nonvolatile memory 30 is provided as the main program store for the modem. All of the software used to operate the modem, including all of the necessary communication protocols for the modem's communication functions. Because the two nonvolatile memories are intended to be rewritable with significantly different frequencies, the memories 28 and 30 are preferably distinct. If highly rewritable flash memory becomes available, both memories might be provided within a single array.

The flash memory 30 is intended to be overwritten only when the operating software of the modem is to be replaced in its entirety, such as when it is necessary to overwrite the software to accommodate a change in modem communication protocols. During conventional usage, the block of memory 30 is overwritten or rewritten infrequently, allowing this memory to be block erase flash memory. Typically the block erase flash memory 30 is adapted for easy block overwriting, including providing the memory with a block erase and rewriting program that is transferred into the microprocessor 26 when that memory is to be overwritten.

Alternately, the memory 30 may provide a secure memory area that is not overwritten when the rest of the memory is overwritten in its entirety.

Most of the circuitry and programming for the modem 10 is conventional and so is not discussed in depth here. The operating software for the modem is preferably altered in accordance with the FIG. 1 embodiment to include an encryption algorithm that can be accessed when identifying indicia are transmitted. Appropriate encryption algorithms vary widely but are generally available. Here, the preferred encryption algorithms will be of the limited type that is readily exported, as additional security is not believed necessary at this time. Stronger encryption could of course be used.

The FIG. 1 embodiment of a modem preferably includes a circuit that stores identification indicia 32 unique to each modem, with the identifying indicia associated with the modem during the manufacture of the modem circuitry in this preferred embodiment of the invention. Appropriate identifying indicia might be a string of digits of sufficient length to specifically identify any possible user uniquely. The identification number, or similar identifying indicia, preferably is permanently provided during manufacture within the modem circuitry. An appropriately inexpensive personalization method is preferred, such as laser programming or fuse programming. The indicia might be stored in a small, once programmable mask ROM or might equivalently be defined within programmable logic. The identification number or other indicia are provided so the communications software running within microprocessor 26 can readily access the indicia. The software stored within ROM 30 is preferably modified to accommodate the communication of the identifying indicia to a host server or other computer in communication with the modem. The processor 26 might, for example, access the indicia 32 in a register read. During operation, the user, host server or the modem itself prompts the specially modified version of the modem operating software to read the identification number in what is essentially a register read operation. The microprocessor 26 preferably then encrypts the number or other read out indicia and communicates the read out value through the facilities of the modem to the host server, thereby providing the identifying indicia to the host.

Preferably, the modem 10 is included within a single package, preferably a PCMCIA package. In many instances the modem 10 can be provided on a single piece of silicon. Whether or not this is cost effective, it is preferred that the identifying indicia 32 be provided on the same piece of silicon as the microprocessor 26. This places control of the identifying indicia in the hands of the modem chip manufacturer, which can make alteration or duplication of the modem chip very difficult.

Figure 2:
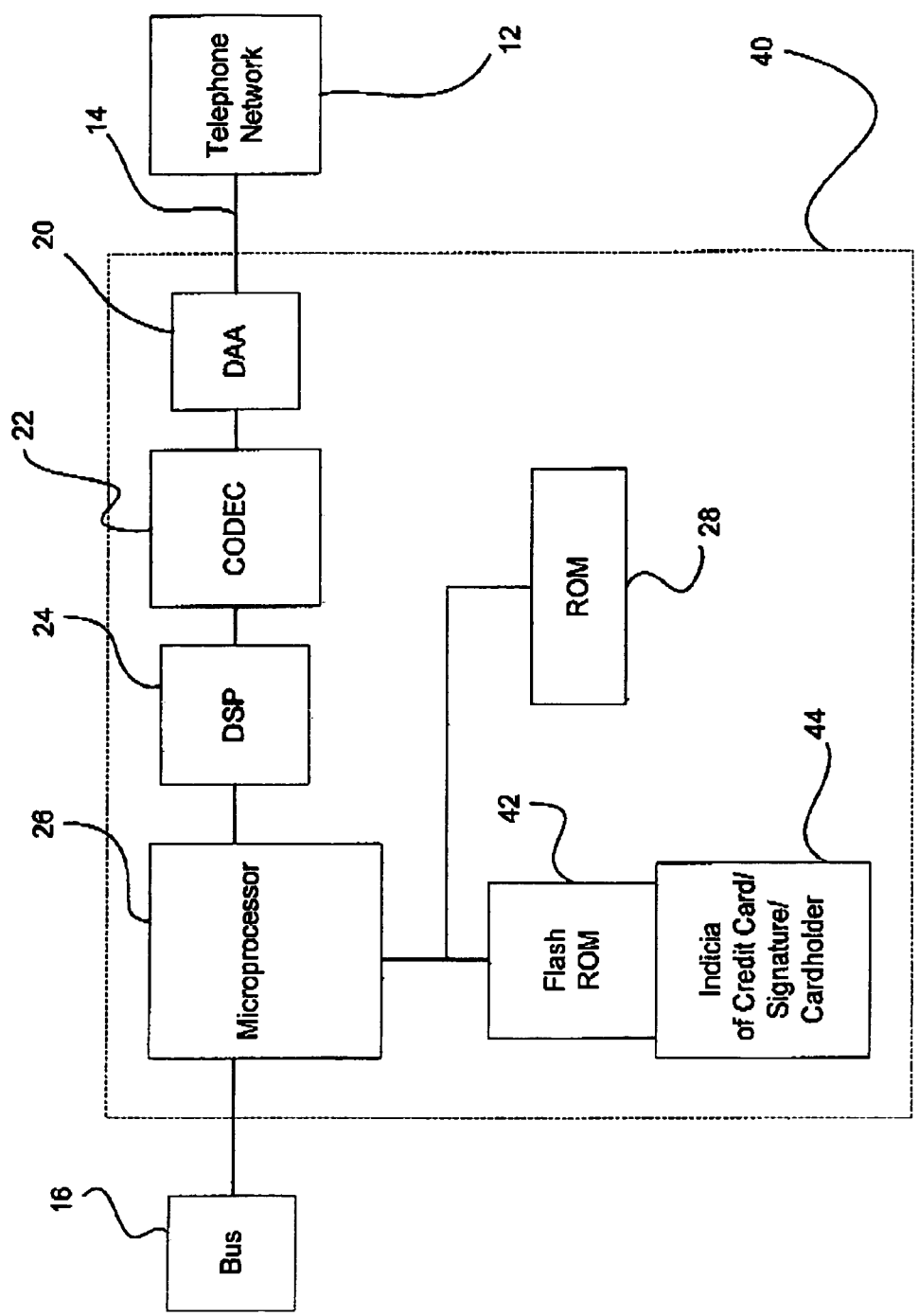
FIG. 2 illustrates an alternate embodiment of a modem in accordance with the present invention.

FIG. 2 shows a different embodiment of the present invention, including a modem 40 usable in a similar manner in preferred secure communication methods in accordance with the present invention. Most of the circuitry of the modem 40 of FIG. 2 is the same as the circuitry of FIG. 1 and so is not discussed further here. As shown in FIG. 2, the identifying indicia of FIG. 1 need not be provided to the FIG. 2 embodiment of the modem. Rather, the memory 42 in which the modem operating software is stored is modified or supplemented to provide indicia storage space 44. The indicia storage space 44 is preferably provided in a memory associated with the memory in which the modem operating software is stored. The indicia storage space is preferably associated with the memory space, whether physically or logically, so that the only way to alter the indicia or other data stored in the indicia storage space is to alter the modem's program memory. Most preferably, the program memory rewrite or overwrite program conventionally provided for rewriting or overwriting the program memory 42 identifies the memory space 44 as memory to be overwritten when the memory 42 is overwritten.

By providing identifying indicia within memory that can only be altered by overwriting the modem program, it becomes difficult to counterfeit the identifying indicia or the secure modem. It should be noted that the memory space 44 could be provided entirely within the logical address space assigned to the memory 42 to make it still more difficult to counterfeit the indicia or the modem in its entirety. The memory management software of the modem is modified to expect a portion of the memory to be devoted to the identifying indicia. In a manner similar to that used in the embodiment of FIG. 1, the modem software is modified to transmit the identifying indicia when required to validate a transaction. The identifying indicia may be encrypted for transmission in a manner similar to the FIG. 1 embodiment if additional security is desired. Alternately, if additional security is desired, either user data such as a personal identification number or a password can be requested by the transaction server. Similarly, a voice communication of identification information could also be used to confirm the validity of the transaction.

In the FIG. 2 embodiment of a preferred modem, the identifying indicia are preferably stored into the modem after the manufacturing process. The modem 40 is prepared to receive the indicia by providing the indicia memory space 44 and by altering the communications software so that the modem can transmit the data stored in the indicia memory space 44 when needed. The identifying indicia are preferably stored into the modem by the financial institution issuing the modem or that will process the financial transactions. In particularly preferred embodiments, the identifying indicia might be an image of the credit card, complete with signature and preferably the image of the credit card holder. Such an image is preferably stored to memory space 44 in a widely accepted data format such as the ".pdf" format used by the Acrobat program of Adobe Software. Such a compressed graphics format is useful because it is nearly universally accessible and is compact for quick transmission over a modem. Other appropriate compressed graphics formats are, of course, known and might be used.

Figure 3:
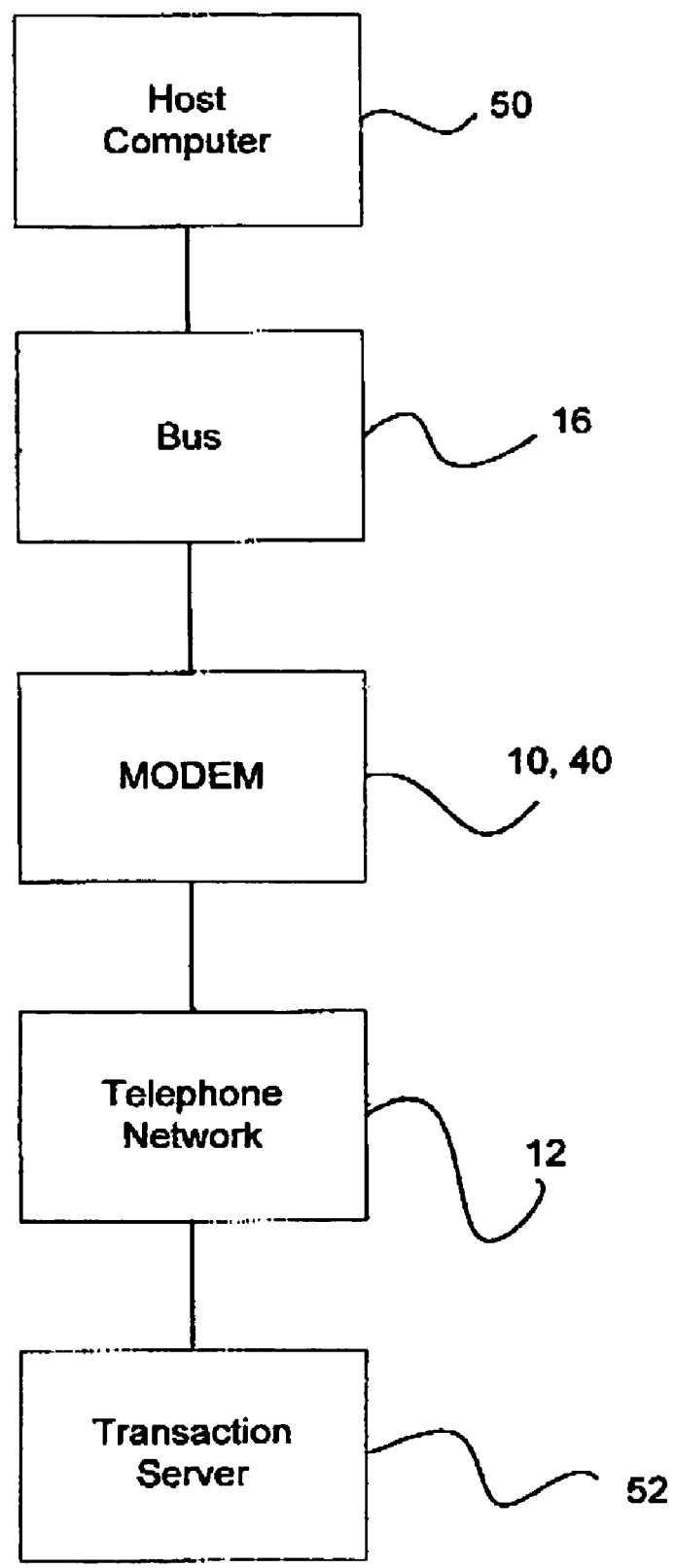
FIG. 3 illustrates an implementation of embodiments of the present invention in an online transaction environment.

FIG. 3 shows an electronic commerce, online transaction environment according to the present invention in which either of the modems of FIG. 1 or 2 might be used. The modem 10, 40 is installed within a host computer 50 so that the modem communicates with the host computer 50 over the bus 16. The host computer 50 couples through the modem 10, 40, through the telephone network 12 to a transaction server 52. A transaction proceeds in the conventional manner, except the modem 10, 40 can communicate identifying indicia to the transaction server 52 as needed to authenticate or validate a transaction.

The present invention has been described in terms of certain preferred embodiments thereof. It should be appreciated, however, that these specific embodiments are provided by way of example to enhance the understanding of the present invention. Those of ordinary skill in the art will appreciate the modifications, variations and extensions of the particular embodiments described herein are possible without varying form the fundamental teachings of the present invention. As such, the present invention is not to be limited to any particular embodiment but is instead the scope of the invention is to be determined by the claims, which follow.

What is claimed is:

1. A secure communications method, comprising:
providing a modem capable of storing identifying indicia unique to the modem, wherein the identifying indicia includes graphics data, the graphics data comprising an image of at least one of a credit card, a signature, or an account holder; and
providing communications software stored within the modem, capable of transmitting identifying indicia to a communications line, wherein the identifying indicia are stored in the modem within a memory associated with a program memory of the modem and wherein the identifying indicia are writable only when the program memory is overwritten.

2. The secure communications method of claim 1, wherein the modem stores the identifying indicia integral to the modem.

3. The secure communications method of claim 2, wherein the identifying indicia comprises bits accessible by processing circuitry of the modem in a read operation, the process circuitry reading the bits prior to causing the bits to be transmitted over the communications line.

4. The secure communications method of claim 3, wherein the bits are stored within a memory array.

5. The secure communications method of claim 1, comprising a process for permanently fixing the identifying indicia in circuitry of the modem.

6. The secure communications method of claim 5, wherein the process for permanently fixing comprises blowing fuses.

7. The secure communication method of claim 5, further comprising encrypting the identifying indicia prior to causing the identifying indicia to be transmitted over the communications line.

8. The secure communications method of claim 1, wherein the identifying indicia are formatted as compressed graphics data.

9. A secure communications modem, comprising:
a program memory adapted to store a program controlling aspects of modem operation; and
a processor, coupled to the program memory, the processor executing at least a portion of a program stored in the program memory to control at least an aspect of modem operation, the program adapted to cause the processor, under control of the program, to read identifying indicia stored integrally within the modem and communicate the identifying indicia to a host communicating with the modem, wherein the identifying indicia includes graphics data, the graphics data comprising an image of at least one credit card including a credit card number, wherein the identifying indicia are stored in an indicia memory, the indicia memory writable only when program memory is written.

10. A secure communications modem, comprising:
a program memory adapted to store a program controlling aspects of modem operation; and
a processor, coupled to the program memory, the processor executing at least a portion of a program stored in the program memory to control at least an aspect of modem operation, the program adapted to cause the processor, under control of the program, to read identifying indicia stored integrally within the modem and communicate the identifying indicia to a host communicating with the modem, wherein the identifying indicia includes graphics data, the graphics data comprising an image of at least one credit card including a credit card number, wherein the identifying indicia are stored permanently within the modem.

11. The modem of claim 10, further comprising means for encrypting the identifying information prior to communicating the identifying information to the host.

12. The modem of claim 10, wherein the identifying indicia identify an aspect of a financial transaction account.

* * * * *